(12) United States Patent
Davis et al.

(10) Patent No.: US 8,468,208 B2
(45) Date of Patent: Jun. 18, 2013

(54) SYSTEM, METHOD AND COMPUTER PROGRAM TO BLOCK SPAM

(75) Inventors: John Fred Davis, Research Triangle Park, NC (US); Kevin David Himberger, Research Triangle Park, NY (US); Clark Debs Jeffries, Durham, NC (US); Garreth Joseph Jeremiah, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/532,061

(22) Filed: Jun. 25, 2012

(65) Prior Publication Data

US 2012/0265834 A1 Oct. 18, 2012

Related U.S. Application Data

(63) Continuation of application No. 10/796,161, filed on Mar. 9, 2004, now abandoned.

(51) Int. Cl.
*G06F 15/16* (2006.01)

(52) U.S. Cl.
USPC ............................................. 709/206

(58) Field of Classification Search
USPC ............................................. 709/206
See application file for complete search history.

(56) References Cited

U.S. PATENT DOCUMENTS

| | | | |
|---|---|---|---|
| 6,507,866 B1 | 1/2003 | Burchi | |
| 6,546,416 B1 | 4/2003 | Kirsch | |
| 7,072,944 B2 | 7/2006 | Lalonde et al. | |
| 7,174,453 B2 | 2/2007 | Lu | |
| 2003/0069933 A1 | 4/2003 | Lim | |
| 2004/0088359 A1* | 5/2004 | Simpson | 709/206 |
| 2004/0177120 A1 | 9/2004 | Kirsch | |
| 2005/0080855 A1 | 4/2005 | Murray | |
| 2005/0198159 A1 | 9/2005 | Kirsch | |
| 2005/0198160 A1 | 9/2005 | Shannon et al. | |
| 2005/0198173 A1* | 9/2005 | Evans | 709/206 |
| 2007/0083606 A1 | 4/2007 | Malik et al. | |
| 2007/0250586 A1 | 10/2007 | Kirsch | |

FOREIGN PATENT DOCUMENTS

| | | |
|---|---|---|
| JP | 3229545 A | 10/1991 |
| KR | 2002046269 | 6/2002 |
| WO | WO0033205 A1 | 6/2000 |

OTHER PUBLICATIONS

"Source Filtering in IP Multicase Routing", Change-Jung Kao, et al. IEEE 2001 p. 82-90.
Research Disclosure "Method of building a Dynamic, Learning Email Spam Filter Through Heuristics" RD n455 Mar. 2002 #151 p. 511.
Lambert Anselm, "Analysis of Spam", Sep. 2003; Department of Computer Science, University of Dublin, Trinity College; p. 74.
Barracuda Networks: "Barracuda Spam Firewall"; archive date: Oct. 1, 2003 access date Nov. 13, 2007.
The Spamhaus Project Dec. 11, 2001, Retrieved from <http://web.archive.org/web/20011211165406/http://www.spamhaus.org/sbl/> on Jun. 9, 2008.
Spamhaus SBL Advisory, SBL Policy & Listing Criteria, Retrieved from http://www.spamhaus.org/sbl/policy.html on Jun. 25, 2008.

* cited by examiner

*Primary Examiner* — Ryan Jakovac
(74) *Attorney, Agent, or Firm* — Arthur J. Samodovitz

(57) ABSTRACT

A system, method and program product for blocking unwanted e-mails. An e-mail is identified as unwanted. A source IP address of the unwanted e-mail is determined. Other source IP addresses owned or registered by an owner or registrant of the source IP address of the unwanted e-mail are determined. Subsequent e-mails from the source IP address and the other IP addresses are blocked. This will thwart a spammer who shifts to a new source IP address when its spam is blocked from one source IP address.

15 Claims, 3 Drawing Sheets

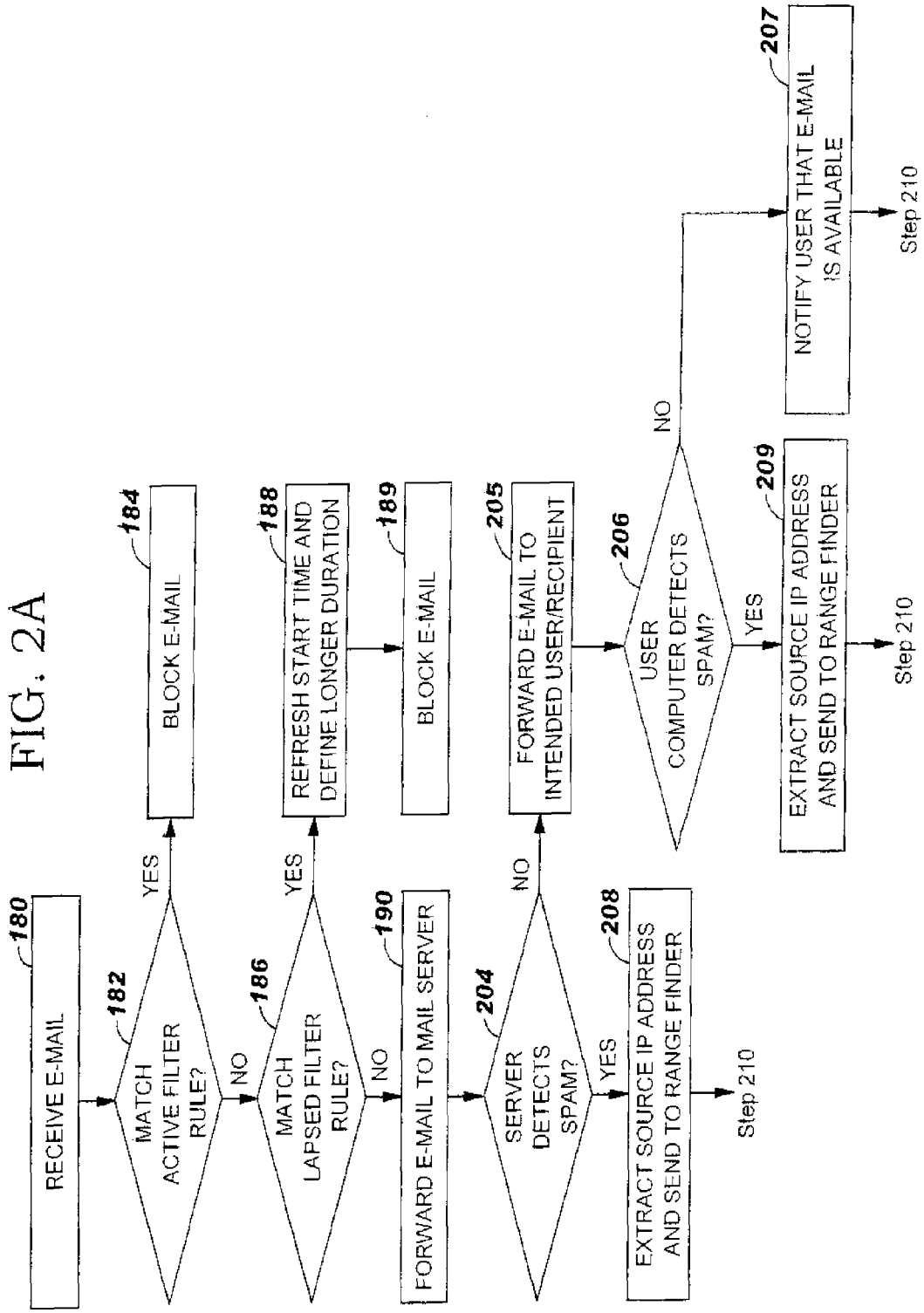

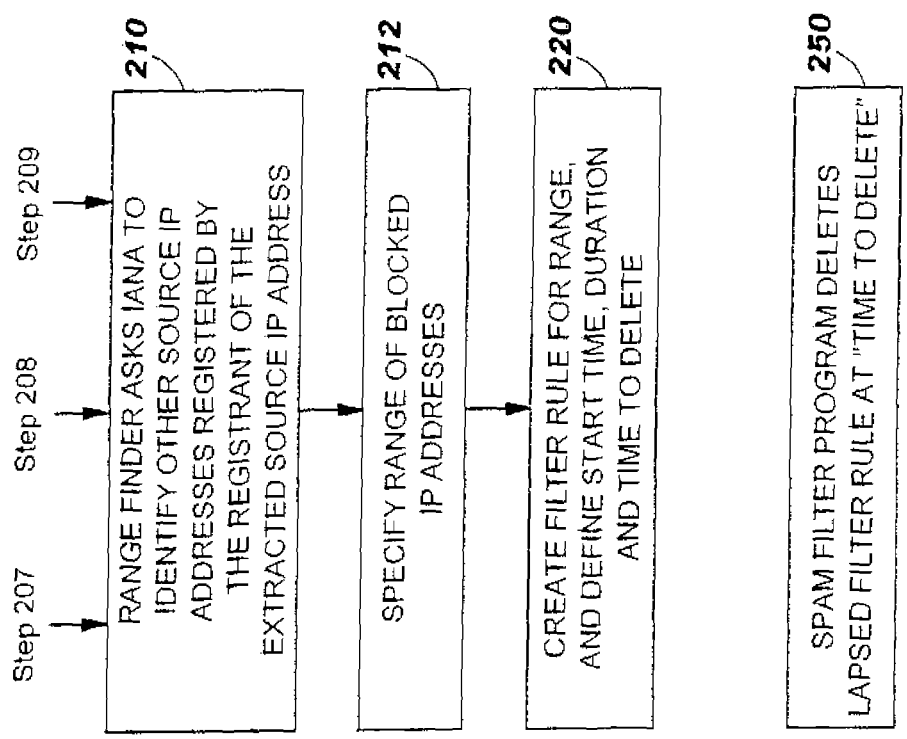

SYSTEM, METHOD AND COMPUTER PROGRAM TO BLOCK SPAM

CROSS REFERENCE TO RELATED APPLICATION

This application is a continuation of co-pending U.S. Ser. No. 10/796,161, filed Mar. 9, 2004 which published Sep. 15, 2005, as U.S. Patent Publication No. 2005-0204159 A1.

FIELD OF THE INVENTION

The invention relates generally to computer systems, and deals more particularly with a technique to effectively block spam.

BACKGROUND OF THE INVENTION

The Internet is well known today, and comprises a network of user computers and servers. One role of the Internet is to provide a vehicle to exchange e-mail. A common problem today is "spam", where a server sends commercial e-mails to numerous (thousands, even millions of) user computers via the Internet. The spam clogs the Internet and the mail boxes of the user computers, and wastes user time in identifying the spam and deleting it. Spam detectors and filters are well known today such as Spam Assasin™ program. Typically, a spam detector and filter are installed at an edge router or a firewall for a server. The server provides an e-mail transfer function for multiple user computers. The spam detector reviews incoming e-mail to detect when the same e-mail (i.e. same or substantially the same text) is addressed to multiple different users. The spam detector may ignore e-mails sent from entities known to be bona fide correspondents, such as employees of the same corporation to which the e-mails are sent. These entities can be recorded on a list accessible to the spam detector. But, the same e-mails sent from another entity to multiple different users are assumed to be spam. For those cases where the e-mails are assumed to be spam, the spam detector reads the IP address of the sender, and then blocks subsequent e-mails from the same IP address by creating a spam filter rule. Each spam filter rule may specify a source IP address from which e-mail will not be accepted. The filter rule is enforced at the firewall or router, or the gateway server in the absence of a firewall or router. The blockage or filter rule may be in effect for a predetermined amount of time, or can be periodically removed when there filter becomes too complex.

The problem with the foregoing spam blocking technique is that the "spammers", i.e. the servers sending the spam, learn when their e-mails are being blocked. They can learn this by observing the TCP response to each of their e-mails. In the case of an e-mail being blocked, there will not be any acknowledgment. When their e-mails are being blocked, the spammers use a different server with a different IP address or a different IP address from the same server to send the spam. This will defeat the spam filter for a time until the spam filter identifies this new IP address as that of a spammer, and then blocks subsequent e-mails from this new IP address with a new filter rule. The foregoing iterative process can continue indefinitely, with the result that the spammer succeeds in getting a large amount of spam past the spam filter (between generation of the appropriate filter rules).

An object of the present invention is to improve spam detection and blocking.

SUMMARY

The invention resides in a system, method and program product for blocking unwanted e-mails. An e-mail is identified as unwanted. A source IP address of the unwanted e-mail is determined. Other source IP addresses owned or registered by an owner or registrant of the source IP address of the unwanted e-mail are determined. Subsequent e-mails from the source IP address and the other IP addresses are blocked. This will thwart a spammer who shifts to a new source IP address when its spam is blocked from one source IP address.

According to features of the present invention, the other source IP addresses owned or registered by an owner or registrant of the source IP address of the unwanted e-mail are determined by first determining an owner or registrant of the source IP address of the unwanted e-mail. The owner or registrant of the source IP address of the unwanted e-mail and the other IP addresses owned or registered by this owner or registrant are determined by querying an entity that manages registration of IP addresses. This entity may be the Internet Assigned Number Authority. An email can be identified as unwanted when it has the same text or subject line as other e-mails sent from the same source IP address.

BRIEF DESCRIPTION OF THE FIGURES

FIGS. 2(A) and 2(B) form a flow chart of a spam detection and blocking within the computer system of FIG. 1, according to the present invention.

DETAILED DESCRIPTION OF THE PREFERRED EMBODIMENTS

Figure 1:
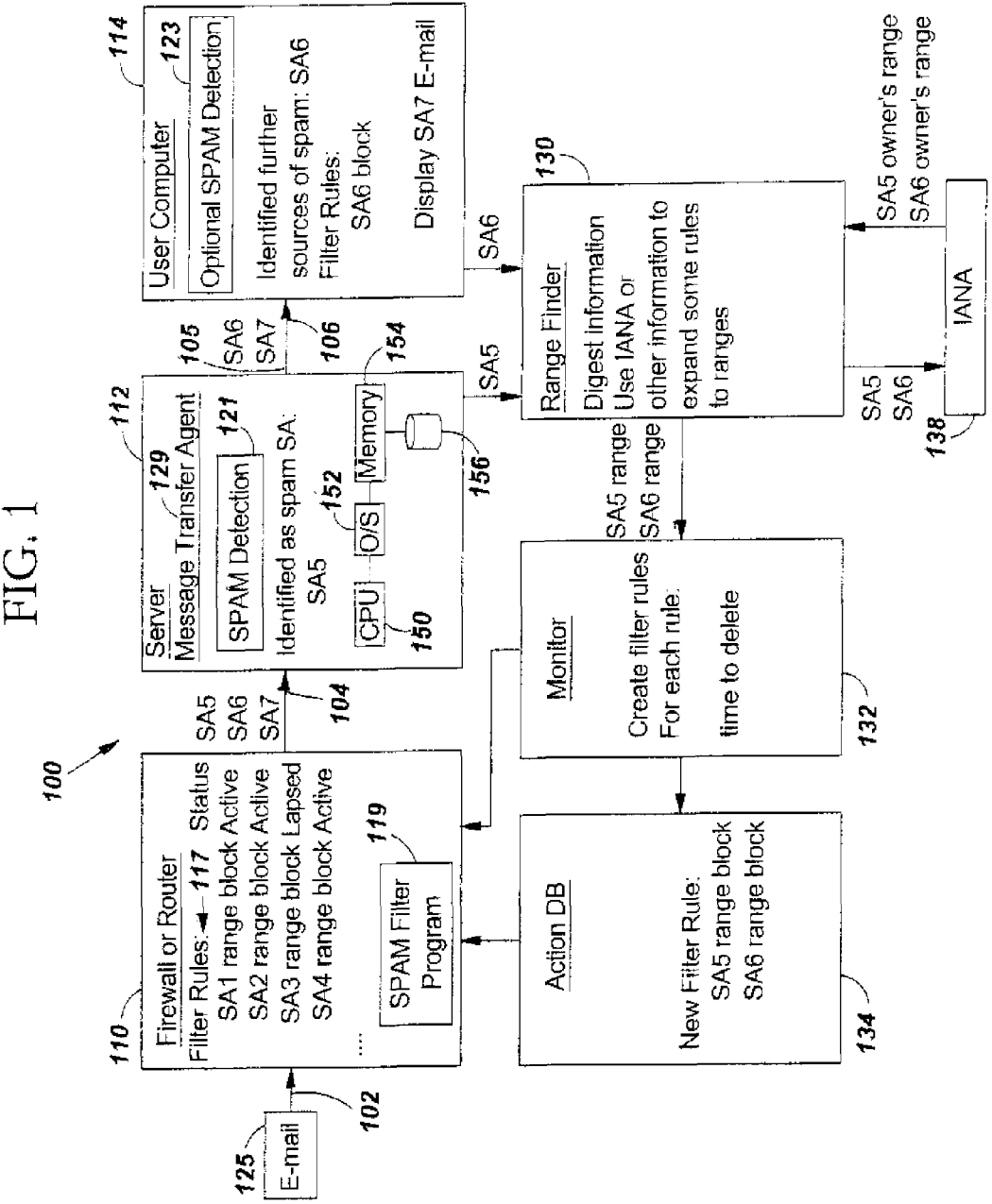
FIG. 1 is a block diagram illustrating a computer system which incorporates the present invention.

The present invention will now be described in detail with reference to the figures. FIG. 1 illustrates a distributed computer system generally designated 100. System 100 comprises a firewall or router 110, a server 112 coupled to the firewall or router 110 in a subnet 103, and a multiplicity of client/user computers such as computer 114 coupled to server 112 via a Local Area Network (LAN) 105. Server 112 includes a known CPU 150, operating system 152, 154 and hard drive storage 156. The firewall or router 110 performs typical functions of known firewalls such as blocking e-mails with Source Addresses (SAs) known to be currently malicious. In addition, firewall or router 110 also includes a spam filter program 119 which reviews each incoming e-mail and ascertains from its header its source IP address, i.e. the IP address of the sender of the e-mail. The firewall or router 110 includes a set of filter rules 117 each defined to block e-mail from a respective IP address or range of IP addresses (typically for a finite period of time). So, if the IP address of the sender of the e-mail matches one of the filter rules (and the filter rule is still in effect), then the firewall or router 110 "blocks" the e-mail, i.e. prevents it from passing through to the server 112. The example of FIG. 1 illustrates four filter rules (SA1, SA2, SA3 and SA4) in firewall or router 110. Each of the filter rules blocks e-mails from a respective range of source IP addresses (for a finite period of time).

The server 112 includes a message transfer agent ("MTA") 129, in storage 156, i.e. a program function which forwards e-mail, determined not to be spam, received from the firewall or router 110 to the intended recipient/user. For example, MTA 129 can be that of Postfix (trademark of Postfix Corporation) program. The server 112 also includes a known spam detector 121 such as Spam Assassin™ spam detector program in storage 156. The spam detector 121 may be part of the MTA 129 or a separate program. The spam detector reviews incoming e-mail to detect when the same e-mail (i.e. the same or substantially the same text) is addressed to multiple different recipients/users. The spam detector may ignore e-mails sent from bona fide correspondents, such as employees of a corporation to which the e-mails are sent, such that these e-mails are not considered to be spam. The "bona fide correspondents" may be recorded on a list accessible to the spam detector. But, the same e-mails sent from another entity to multiple recipients/users are assumed to be spam. The user computer 114 may also include an optional spam detector program 123 which identifies spam based on host-based screening software or preferences of the user. The source IP addresses identified by this optional spam detector program 123 result in additional filter rules (each blocking e-mail from a single IP address or range of IP addresses) that can be applied at the firewall or router 110.

FIGS. 2(A) and 2(B) form a flow chart illustrating operation of the spam filter program 119, spam detector 121, optional spam detector 123, range finder program 130 and monitor program 132 in accordance with the present invention. In step 180, an incoming e-mail 125 is received by the firewall or router 110. In response, the spam filter program 119 determines if the source IP address of the e-mail matches any of the active filter rules 117 (decision 182). (Any existing filter rules 117 may have been created in previous iterations of the steps of FIGS. 2(A) and 2(B).) An "active" filter rule is one that has been created and started, but not yet lapsed. As explained below, when a filter rule is created, it is assigned a start time (which is usually immediate upon creation) and a duration/period during which the filter rule is active, i.e. will be enforced. If there is an active filter rule which matches the source IP address of the current e-mail, then the e-mail is blocked, i.e. it is discarded and not permitted to pass through the firewall or router 110 to the server 112 (step 184). However, if the source IP address of the e-mail does not match any of the active filter rules 117, or if there are no active filter rules at this time, then the spam filter program 119 determines if the source IP address of the e-mail matches a lapsed/suspended filter rule, i.e. a filter rule which has not yet been deleted but whose duration/period of activity has lapsed (decision 186). If so, the spam filter program 119 refreshes the start time of the lapsed filter rule to the current time to make it active once again, and defines a new duration/period that was longer than the previous one, for example, twice as long or "x" minutes longer (step 188). (In step 188, the spam filter program 119 also resets a "time to delete" by advancing it an amount equal to the difference between the original start time and the refreshed start time. The purpose of the "time to delete" is described below.) Also, the spam filter program 119 will block this e-mail corresponding to the lapsed/suspended filter rule, and discard it so that it will not pass through the firewall or router 110 to server 112 (step 189). Referring back to decision 186, no branch, if the current e-mail does not match a lapsed/suspended filter rule (or an active filter rule), then firewall or router 110 passes the e-mail through to the mail server 112 with its MTA 129 and spam detector 121 (step 190). Next, the spam detector 121 within server 112 determines if the e-mail appears to be spam, i.e. the same text as other e-mail sent by the same unknown IP source address (decision 204). The spam detector 121 makes this determination by any of numerous well known methods such as comparing text from the same source IP address. This comparison can be made using a hash function on some or all the lines of text of the different e-mails from the same source IP address. Spam may also be assumed when the subject lines of the e-mails from the same IP address are all the same. If the e-mail does not appear to be spam, then the spam detector 121 notifies MTA 129 which forwards the e-mail to its intended recipient indicated in the header of the e-mail, such as client computer 114 (step 205). (In the example illustrated in FIG. 1, e-mails with source addresses SA5, SA6 and SAA were passed from the firewall or router 110 to the mail server 112, and spam detector 121 identified the e-mail from SA5 as spam.) However, if the e-mail appears to be spam, then the spam detector 121 extracts the source IP address of the e-mail and sends it to a range finder program 130 (step 208). (In the example illustrated in FIG. 1, spam detector 121 sent source address SA5 to range finder program 130.)

Refer again to decision 204 no branch where the server 112 forwards the e-mail to the user computer 114. (In the example illustrated in FIG. 1, MTA 129 forwarded e-mails with source addresses SA6 and SAA to user computer 114.) If the user computer 114 includes another, optional spam detector 123, then the spam detector 123 determines if the e-mail appears to be spam, i.e. the same text as other e-mail sent by the same unknown IP source address (decision 206). The spam detector 123 makes this determination by, for example, comparing the source IP address to a list of forbidden source IP addresses as specified by the user or an administrator. The spam detector 123 can also make this determination by searching for forbidden words in the subject line or text, where the forbidden words are specified by the user or administrator. If the e-mail does not appear to be spam, then the spam detector 123 notifies the user that the e-mail is waiting to be read (step 207). (In the example illustrated in FIG. 1, spam detector 123 determined that the e-mail from source IP address SAA was not spam, and therefore, presented it to the user.) However, if the e-mail appears to be spam, then the spam detector 123 extracts the source IP address of the e-mail and sends it to the ranger finder program 130 (step 209). (In the example illustrated in FIG. 1, spam detector program 123 determined that the e-mail from source IP address SA6 was spam, and therefore, did not present the e-mail to the user, and instead send the source IP address SA6 to the range finder program 130.)

The range finder program 130 may reside in storage 156 in server 112 or in another server coupled to server 112 by a network. The range finder program 130 is also coupled by a network to an existing/known Internet service company called "Internet Assigned Number Authority" company or "IANA" 138 (or a similar Internet service). IANA 138 currently maintains a database of all (that is, the range 60.70.80.0 through 60.70.80.127) addresses and the entity that "owns" or registers each block of IP addresses. IANA 138 obtains its IP address ownership information based on the following process. Each entity that desires to use an IP source address on the Internet must first register it with IANA. After the spam detector 121 or spam detector 123 notifies the range finding program 130 of a suspected spammer's source IP address, the range finder program 130 contacts "IANA" (or a similar Internet service) by e-mail and supplies the source IP address of the suspected spammer. (In the example of FIG. 1, the range finder program supplies source IP addresses SA5 and SA6 to IANA, although the notification of each source IP address can be done at different times.) The range finding program 130 also asks IANA to state who owns each source IP address and what other IP addresses are owned by this same entity (step 208). IANA supplies the requested information from its registration database. (In the example illustrated in FIG. 1, IANA returns a range of source IP addresses owned/registered by the registrant of SA5, and a range of source IP addresses owned/registered by the registrant of SA6.) After receiving the information from IANA, the ranger finder program defines ranges of source IP addresses from which e-mail should be blocked (step 212). Each "range" is a list of all the IP addresses owned by the owner of the source IP address identified as a spammer by the spam detector in step 204. Because the entire range will be blocked, and not just the source IP address of the single spam e-mail, this will thwart/block a spammer who shifts to another of its registered source IP addresses to send new spam. The "range" can be a sequential range of source IP addresses or a grouping of non-sequential source IP addresses, as the case may be. Alternately, the blocked range can be limited to a smaller range of addresses that contains the detected source IP address and are owned by the owner of the spam e-mail, where the smaller range is a size typically used for spamming, such as a range of thirty two addresses for example, 60.70.80.0 through 60.70.80.31. In another embodiment of the present invention, the range finding program 130 determines the range of blocked source IP addresses as a range of addresses (such as 60.70.80.0 through 60.70.80.256) that contain the source IP address of the spam and are not within the set of source IP addresses known by the manager of the computer system to be of interest.

Next, the range finding program 130 passes the ranges of blocked, source IP addresses to monitor program 132. (In the example illustrated in FIG. 1, there is one range for source IP address SA5 and another range for source IP address SA6.) The monitor program 132 can reside in storage 156 in server 112 or another server which contains the range finder program 130 (if the range finder program 130 does not reside on server 112). Then, the monitor program 132 creates the filter rule(s) to be used by firewall or router 110 (step 220). The filter rule(s) specifies the range of blocked, source IP addresses obtained from the range finder program 130. For the filter rule(s), the monitor program 132 also specifies a start time to begin enforcing the filter rule and a duration/period for enforcing the filter rule as described above.

After defining the filter rule (including its time parameters) in step 220 for each range of blocked IP addresses, the monitor program 132 stores the filter rules in an actions database 134, and notifies the firewall or router 110 that a new filter rule has been added to the data base. In response, the spam filter program 119 copies the new filter rule into its local data base, filter rules 117. (In the example illustrated in FIG. 1, there will be new filter rules for source IP ranges SA5 and SA6 added to filter rules database 117.) As explained above, when each new e-mail is received by the firewall or router 110 in step 180, the spam filter program 119 reads all the filter rules from the database 117 to determine which are active, and therefore should be enforced (decision 182). This decision is based on whether the current time is less than the start time of the filter rule plus the duration/period of the rule, assuming the start time is before or equal to the current time. So, during the duration/period of the rule, the spam filter program 119 enforces the filter rule, i.e. blocks e-mail with a source IP address within the specified range, so that the e-mail will not proceed to mail server 112 (step 184). Also, as explained above, the spam filter program 119 also determines if spam has arrived from a source IP address corresponding to a lapsed/suspended filter rule, in which case the spam filter program 119 restarts/reactivates the filter rule for a longer duration/period, and blocks the current e-mail.

Referring again to step 220, when a new filter rule is created, the monitor program 132 also defines a "time to delete" the filter rule (step 220). The "time to delete" the filter rule specifies when to delete the filter rule if spam ceases from the entire range of IP addresses after the duration/period lapses, i.e. after the filter rule is suspended. Consider an example where the filter rule begins immediately, the duration/period of the filter rule is five minutes and the time to delete is fifteen minutes after start. The filter rule will go into effect immediately and last for five minutes. During those initial five minutes, all e-mails from the range of sources IP addresses specified in the filter rule will be blocked and discarded. Then, the filter rule will be "suspended" for the next ten minutes unless and until new spam is detected from any IP address within the range. If spam is detected during these ten minutes from any IP address within the range, then the filter rule is restarted/reactivated. However, if there is no spam from the entire range of IP addresses specified by the filter rule during these ten minutes, then the filter rule will be deleted altogether at the "time to delete" to "clean-out" the database of filter rules (step 250). Step 250 is performed as follows. Whenever, a "time to delete" occurs, an interrupt or alert is sent to the spam filter program 119. The interrupt or alert specifies the corresponding filter rule. In response to the interrupt or delete, the spam filter program 119 confirms that the corresponding filter rule is still lapsed/suspended and if so, deletes the filter rule altogether. (If the corresponding filter rule is still active at the time to delete, then an error has occurred because the original duration/period of the filter rule should have lapsed, and the time to delete should have been advanced when the filter rule was refreshed. In such a case, an administrator will be notified.)

Based on the foregoing, a system, method and computer program for blocking spam has been disclosed. However, numerous modifications and substitutions can be made without deviating from the scope of the present invention. For example, alternative mechanisms for identifying spam may be used. Therefore, the present invention has been disclosed by way of illustration and not limitation, and reference should be made to the following claims to determine the scope of the present invention.

The invention claimed is:

1. A method of blocking e-mails, the method comprising the steps of:
   generating a filter rule to block a first e-mail from a source of the first e-mail for a first predetermined period, and setting a second predetermined period that extends beyond the first predetermined period, and
   if a second e-mail is received from the source during the first predetermined period, blocking the second e-mail based on the filter rule,
   if a third e-mail is received from the source after an end of the first predetermined period but before an end of the second predetermined period, a computer (a) setting a third predetermined period to block subsequent e-mails from the source, the third predetermined period extending approximately from a time that the third e-mail is received for a duration longer than a duration of the first predetermined period, and (b) setting a fourth predetermined period to extend beyond an end of the third predetermined period such that if a fourth e-mail is received from the source after an end of the third predetermined period but before an end of the fourth predetermined period, the computer setting a fifth predetermined period to block subsequent e-mails from the source, the fifth predetermined period extending approximately from a time that the fourth e-mail is received for a duration longer than the duration of the third predetermined period; and
   if no e-mail is received from the source during the first and second predetermined periods, the computer disabling the filter rule such that if a subsequent e-mail is received from the source, the e-mail is forwarded to its intended destination.

2. The method of claim 1 wherein a duration of the fourth predetermined period equal to a duration of the second predetermined period and begins at an end of the third predetermined period.

3. The method of claim 1 wherein, responsive to the third e-mail being received from the source after an end of the first predetermined period but before an end of the second predetermined period, blocking the third e-mail based on the filter rule.

4. The method of claim 1 wherein the first, second, third and fourth e-mails are received at a firewall.

5. The method of claim 1 wherein the first, second, third and fourth e-mails are received at a router.

6. A computer program product for blocking e-mails, the computer program product comprising:
one or more computer-readable tangible storage devices and program instructions stored on at least one of the one or more storage devices, the program instructions comprising:
program instructions to generate a filter rule to block a first e-mail from a source of the first e-mail for a first predetermined period, and set a second predetermined period that extends beyond the first predetermined period, and
responsive to a second e-mail being received from the source during the first predetermined period, to block the second e-mail based on the filter rule,
responsive to a third e-mail being received from the source after an end of the first predetermined period but before an end of the second predetermined period, (a) to set a third predetermined period to block subsequent e-mails from the source, the third predetermined period extending approximately from a time that the third e-mail is received for a duration longer than a duration of the first predetermined period, and (b) to set a fourth predetermined period to extend beyond an end of the third predetermined period such that if a fourth e-mail is received from the source after an end of the third predetermined period but before an end of the fourth predetermined period, to set a fifth predetermined period to block subsequent e-mails from the source, the fifth predetermined period extending approximately from a time that the fourth e-mail is received for a duration longer than the duration of the third predetermined period; and
responsive to no e-mail being received from the source during the first and second predetermined periods, to disable the filter rule such that if a subsequent e-mail is received from the source, the e-mail is forwarded to its intended destination.

7. The computer program product of claim 6 wherein a duration of the fourth predetermined period is equal to a duration of the second predetermined period and begins at an end of the third predetermined period.

8. The computer program product of claim 6 further comprising program instructions, stored on at least one of the one or more storage devices, responsive to the third e-mail being received from the source after an end of the first predetermined period but before an end of the second predetermined period, to block the third e-mail based on the filter rule.

9. The computer program product of claim 6 wherein the first, second, third and fourth e-mails are received at a firewall.

10. The computer program product of claim 6 wherein the first, second, third and fourth e-mails are received at a router.

11. A computer system for blocking e-mails, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to generate a filter rule to block a first e-mail from a source of the first e-mail for a first predetermined period, and set a second predetermined period that extends beyond the first predetermined period, and
responsive to a second e-mail being received from the source during the first predetermined period, to block the second e-mail based on the filter rule,
responsive to a third e-mail being received from the source after an end of the first predetermined period but before an end of the second predetermined period, (a) to set a third predetermined period to block subsequent e-mails from the source, the third predetermined period extending approximately from a time that the third e-mail is received for a duration longer than a duration of the first predetermined period, and (b) to set a fourth predetermined period to extend beyond an end of the third predetermined period such that if a fourth e-mail is received from the source after an end of the third predetermined period but before an end of the fourth predetermined period, to set a fifth predetermined period to block subsequent e-mails from the source, the fifth predetermined period extending approximately from a time that the fourth e-mail is received for a duration longer than the duration of the third predetermined period; and
responsive to no e-mail being received from the source during the first and second predetermined periods, to disable the filter rule such that if a subsequent e-mail is received from the source, the e-mail is forwarded to its intended destination.

12. The computer system of claim 11 wherein a duration of the fourth predetermined period is equal to a duration of the second predetermined period and begins at an end of the third predetermined period.

13. The computer system of claim 11 further comprising program instructions, stored on at least one of the one or more storage devices for execution by at least one of the one or more processors via at least one of the one or more memories, responsive to the third e-mail being received from the source after an end of the first predetermined period but before an end of the second predetermined period, to block the third e-mail based on the filter rule.

14. The computer system product of claim 13 wherein the first, second, third and fourth e-mails are received at a firewall.

15. The computer system of claim 13 wherein the first, second, third and fourth e-mails are received at a router.

* * * * *